Dec. 29, 1953  C. W. KUBON  2,664,130
VEGETABLE SLICING MACHINE
Filed March 27, 1950  5 Sheets-Sheet 1

INVENTOR.
CLIFFORD W. KUBON
BY
Harry D. Kilgore
ATTORNEY

Dec. 29, 1953  C. W. KUBON  2,664,130
VEGETABLE SLICING MACHINE
Filed March 27, 1950  5 Sheets-Sheet 2
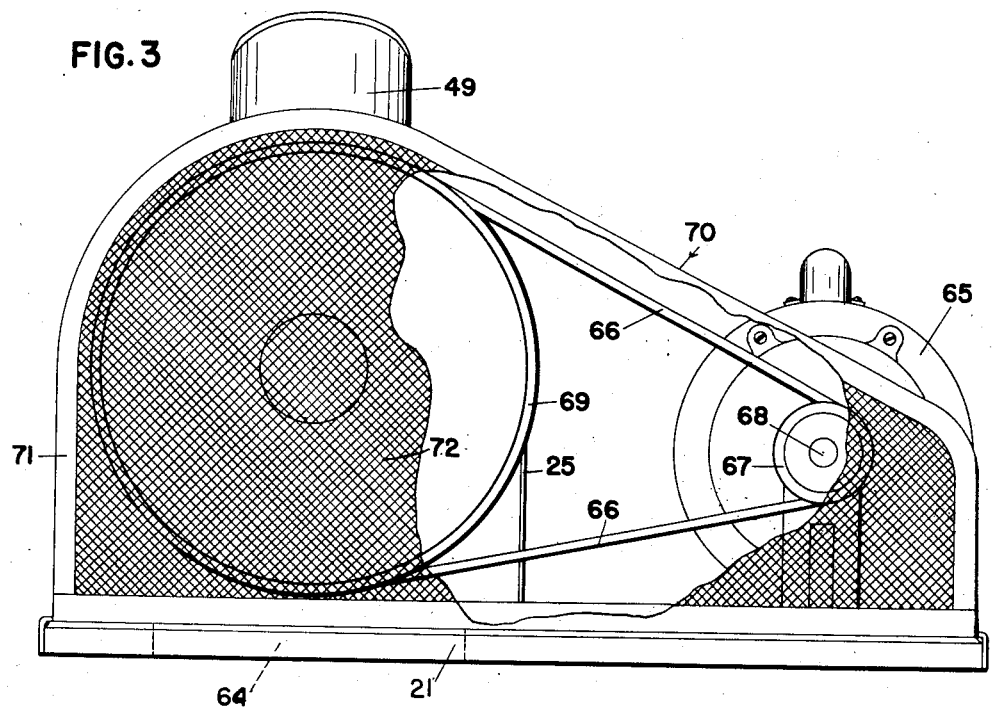
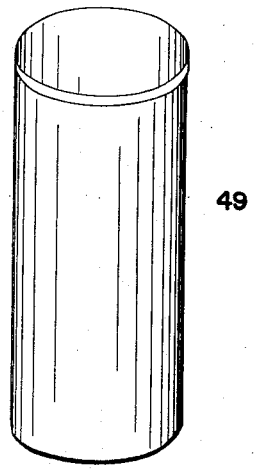
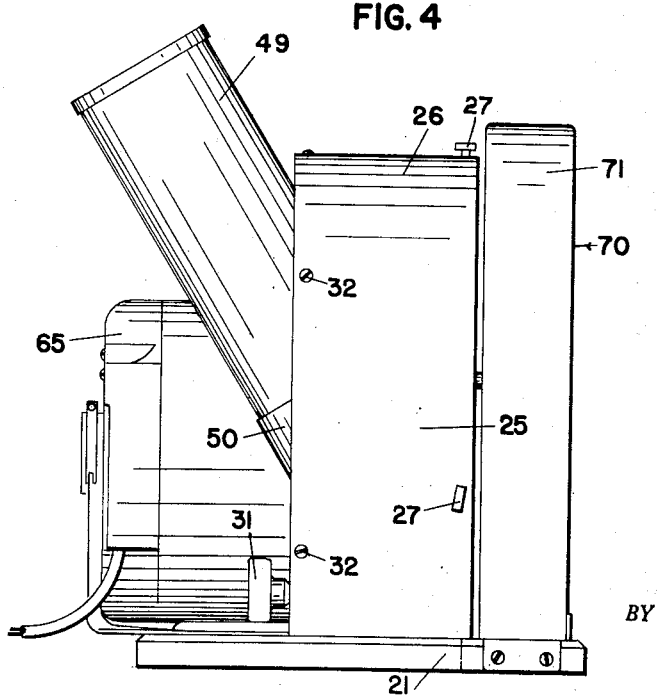
INVENTOR.
CLIFFORD W. KUBON
BY
ATTORNEY Dec. 29, 1953  C. W. KUBON  2,664,130
VEGETABLE SLICING MACHINE
Filed March 27, 1950  5 Sheets-Sheet 3
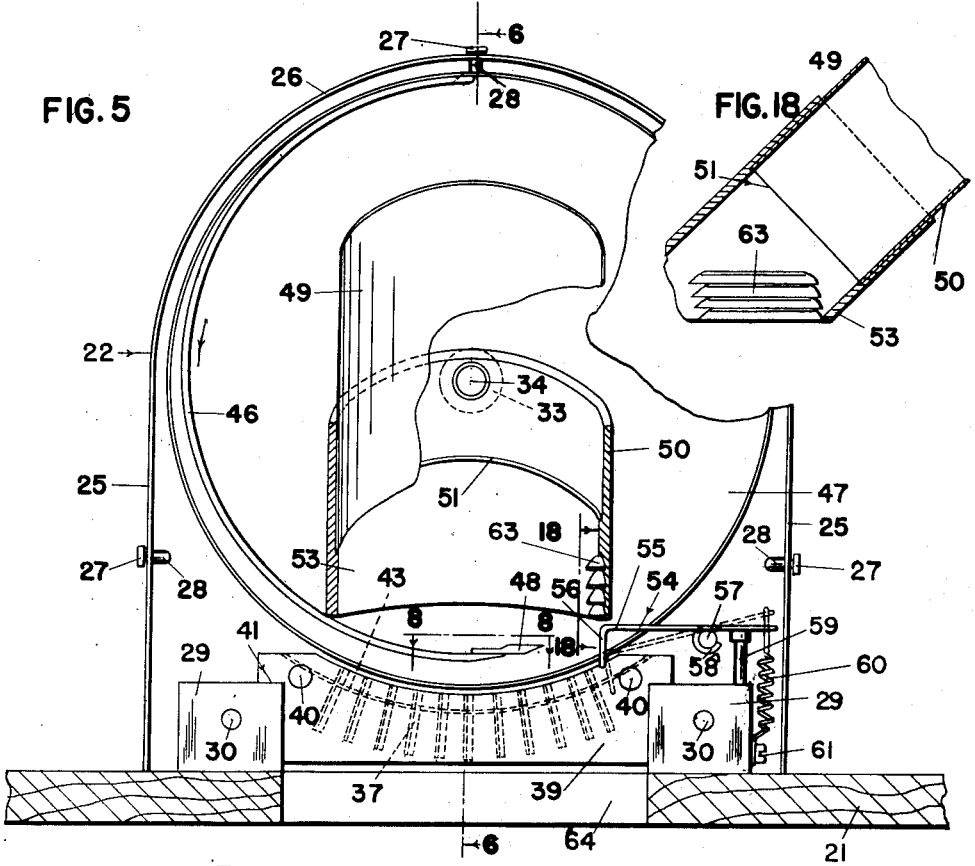
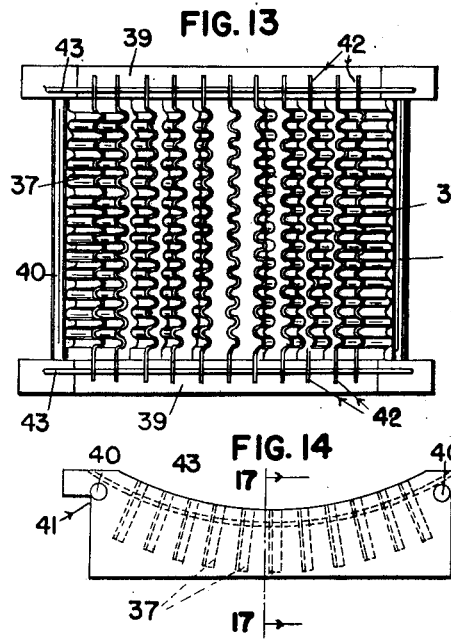
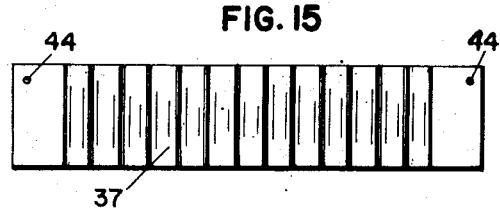
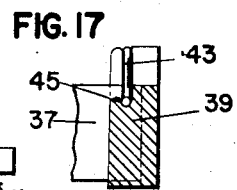
INVENTOR.
CLIFFORD W. KUBON
BY
*Harry D. Kilgore*
ATTORNEY Dec. 29, 1953     C. W. KUBON     2,664,130
VEGETABLE SLICING MACHINE
Filed March 27, 1950     5 Sheets-Sheet 4
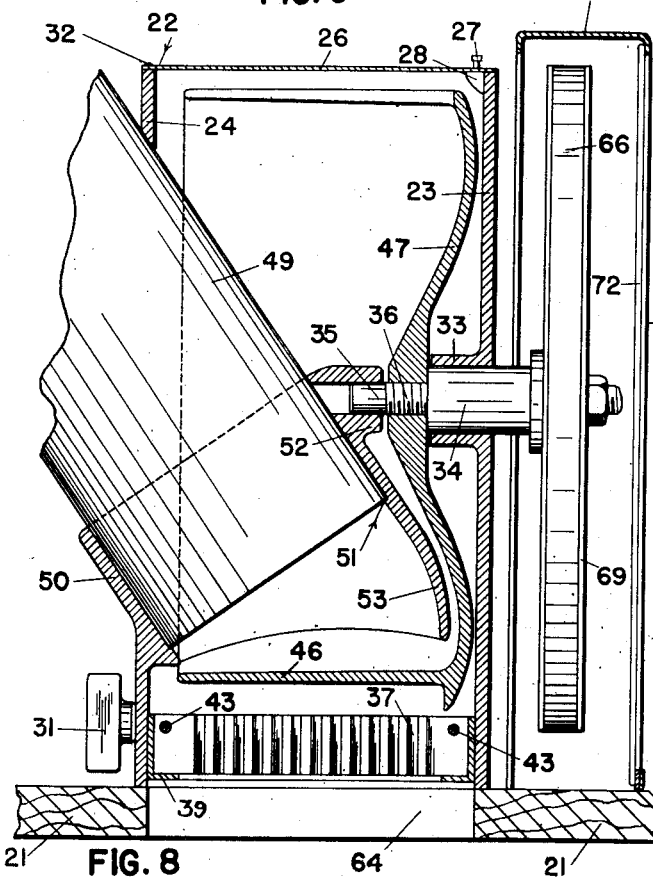
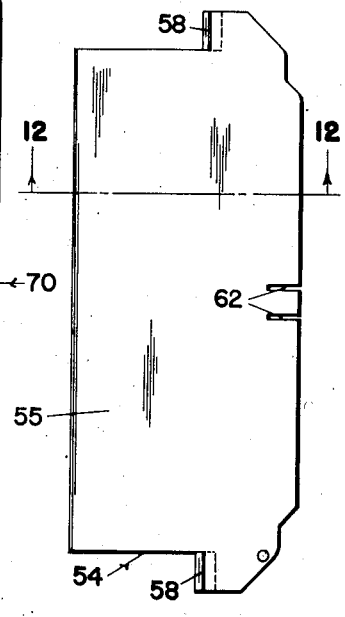
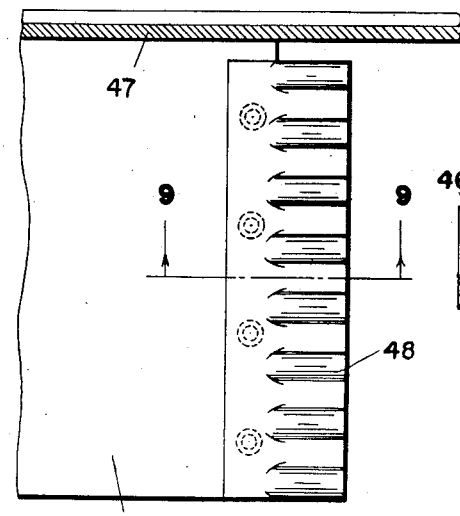
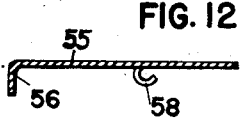
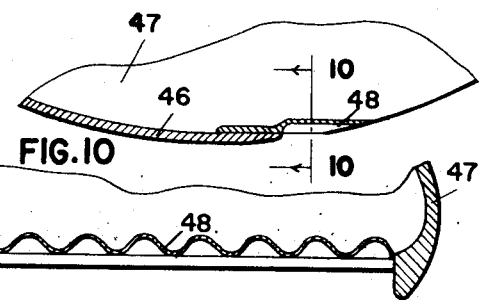
INVENTOR.
CLIFFORD W. KUBON
BY
ATTORNEY Dec. 29, 1953 C. W. KUBON 2,664,130
VEGETABLE SLICING MACHINE
Filed March 27, 1950 5 Sheets-Sheet 5

INVENTOR.
CLIFFORD W. KUBON
BY
ATTORNEY

Patented Dec. 29, 1953

2,664,130

UNITED STATES PATENT OFFICE 2,664,130

VEGETABLE SLICING MACHINE

Clifford William Kubon, Aitkin, Minn.

Application March 27, 1950, Serial No. 155,172

2 Claims. (Cl. 146—78)

My present invention relates to improvements in vegetable slicing machines.

While the invention is intended for general use in cutting vegetables into slices of a constant thickness and in successively cutting the slices into strips of a constant width, it is especially well adapted for preparing potatoes for "French fries."

To simplify and clarify the following statements relating to the invention and the description thereof, the invention will hereinafter be described as used in preparing potatoes for "French fries."

It is well known that it is a slow and tedious process to prepare potatoes for "French" or deep fat frying by hand, and an exceedingly expensive process when the potatoes are prepared for serving to the public in quantities. Unless extreme care is exercised in the cutting, there is little or no uniformity in the shape and appearance of the slices—a highly important factor especially to the commercial trade.

It is further practically impossible to properly cook "French fries" of irregular shapes and particularly of varying thickness for the reason that in this process of frying obviously the thicker strips will be undercooked and the thin and tapered strips overcooked in a given frying time.

An object of this invention is to provide a highly efficient machine for cutting peeled potatoes into slices of a constant thickness and successively cutting the slices into strips of a constant width.

Another object of this invention is to shape the sides of a strip of potato with corrugations, crimps or other shapes to materially increase the area of the strip to more quickly, evenly, and thoroughly cook the same due to the large area exposed to the hot cooking fluid in which the strip is being cooked.

A further object of this invention is to provide novel means for mounting a novel gang of cutting blades for cutting a slice of potato into strips.

A still further object of this invention is to provide a novel rotary cam having, in advance thereof, a novel blade for cutting a slice from a potato that is thereafter pressed by the cam onto the cutting blades of said gang that cuts the same into strips.

Another object of this invention is to provide an automatic stop for stripping a slice of potato from the cam as said slice is cut from a potato.

Still another object of this invention is to prevent the uncut end portion of a potato from lifting from the gang of cutting blades as a slice is being cut therefrom, so that the slice will be of a constant, uniform thickness.

A further object of the invention is to provide a machine that can be quickly and easily disassembled, without the use of tools, to facilitate cleaning of the machine and the removal of any residue and the last cut strips of potatoes from the strip-cutting blades forced therebetween by the cam when the cutting of a given amount of potatoes has been completed.

Other objects of this invention will be apparent from the following description, reference being had to the drawings.

To the above end, generally stated, the invention consists of the novel devices, combination of devices and the product hereinafter described and defined in the claims.

In the accompanying drawings, which illustrate the invention, like characters indicate like parts throughout the several views.

Referring to the drawings:

Fig. 3 is a rear elevational view of the machine, some parts being broken away;

Fig. 4 is a right-hand end elevational view of the improved machine;

Fig. 5 is a fragmentary elevational view of the improved machine, some parts being removed, other parts being broken away and sectioned, on an enlarged scale;

Fig. 6 is a fragmentary view partly in elevation and partly in section taken on the line 6—6 of Fig. 5;

Fig. 7 is a perspective view of the feed hopper removed from the machine;

Fig. 8 is a plan view of the slicing blade and a fragment of the cam to which said blade is attached with the back member of the cam sectioned on the line 8—8 of Fig. 5, on an enlarged scale;

Fig. 9 is a fragmentary detail view, with some parts sectioned on the line 9—9 of Fig. 8;

Fig. 10 is a fragmentary detail view in section taken on the line 10—10 of Fig. 9, on an enlarged scale;

Fig. 11 is a plan view of the automatic stop removed from the machine;

Fig. 12 is a sectional view taken on the line 12—12 of Fig. 11;

Fig. 13 is a plan view of the gang of cutting blades removed from the machine;

Fig. 14 is a side elevational view of the parts shown in Fig. 13;

Fig. 15 is a side elevational view of one of the cutting blades removed from the gang;

Fig. 16 is an upper edge view of the blade shown in Fig. 15;

Fig. 17 is a fragmentary detail view, with some parts sectioned on the line 17—17 of Fig. 14, on an enlarged scale;

Fig. 18 is a fragmentary detail view, with some parts sectioned on the line 18—18 of Fig. 5;

Figure 1:
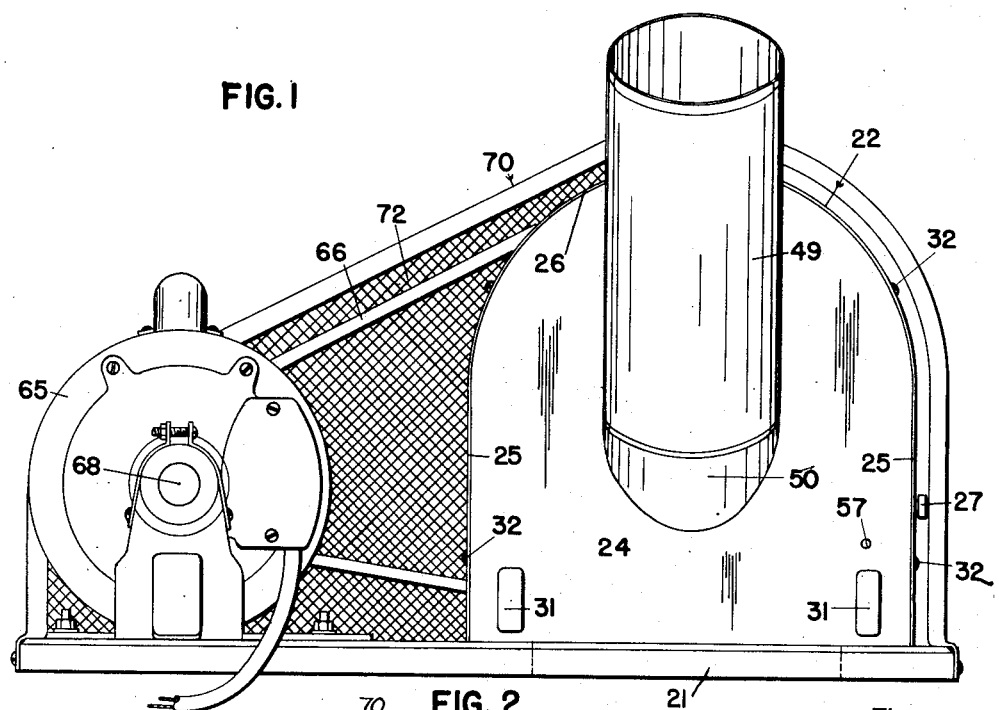
Fig. 1 is a front elevational view of the improved machine.
Figure 2:
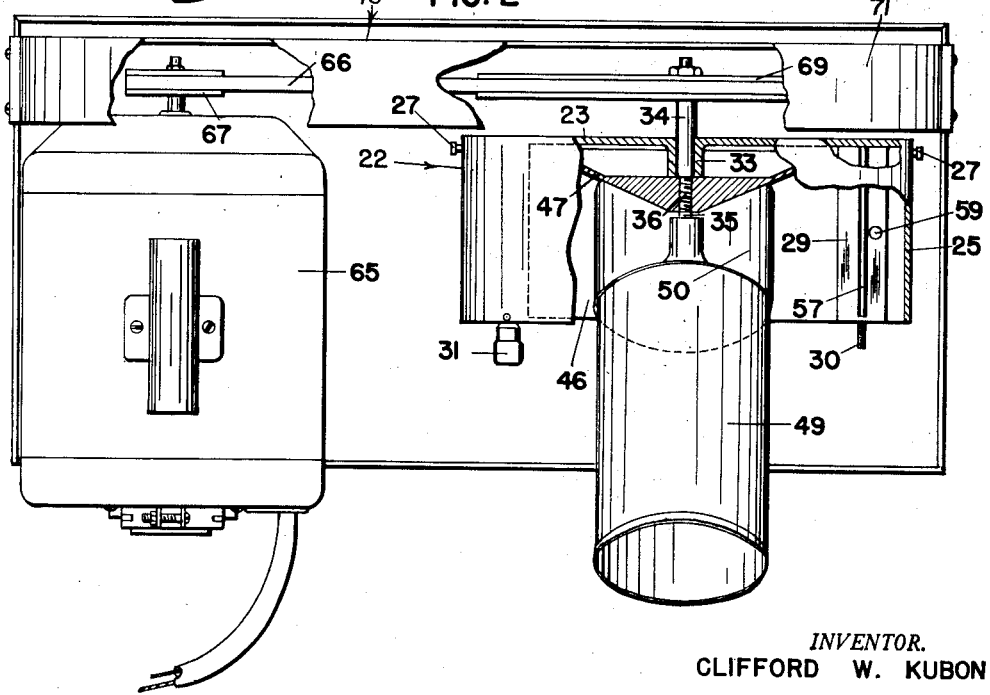
Fig. 2 is a plan view of the same, some parts being broken away and sectioned.

The numeral 21 indicates a portable rectangular base on which is mounted a housing 22. This housing 22 comprises a cast back member 23, a cast front member 24, and side members 25 and a top member 26 formed of a single sheet of metal, said back member being rigidly secured to the base 21. Both the back member 23 and the front member 24 are of the same size as to height and width and their tops are semi-circular. The side members 25 and the top member 26 overlap and engage the edge portions of the back member 23 and the front member 24. Said side members 25 and the top member 26 are detachably secured to the back member 23 by thumb screws 27 that extend through holes in said side and top members and have threaded engagement with bosses 28 on the inner side of the back member 23.

A pair of ways 29, in the form of bars that are rectangular in cross-section, are secured to the base 21 in the housing 22 and extend from the front to the rear thereof. Anchored in the outer end of each way 29 is a screw stud 30 that extends through a bore in the front members 24. Thumb nuts 31 are applied to the screw studs 30, impinge the outer side of the front member 24 and hold the same pressed against the outer end of the ways 29 as stops. The side members 25 and the top member 26 are secured to the front member 24 by screws 32. Obviously, by removing the thumb screws 27 and the thumb nuts 31, the front member 24 and attached side members 25 and the top member 26 may be removed from the machine.

Integral with the back member 23 is a sleeve bearing 33 that projects into the housing 22. The axis of the bearing 33 is aligned with the centers of the semi-circular tops of the back member 23 or the front member 24. A short shaft 34 is journaled in the bearing 33. The inner end portion of the shaft 34 is reduced in diameter to afford a stud 35, the inner end portion of which is provided with a screw thread 36.

A gang of cutting blades 37 is mounted in a frame 38 supported on the ways 29 for sliding movement into and out of the housing 22. Each cutting blade 37 is formed of a wide thin strip of metal that is transversely corrugated except at its end portions. It is important to note that the corrugations in adjacent blades 37 are staggered. The frame 38 is rectangular and comprises a pair of side members 39 connected by a pair of end rods 40. The end portions of the frame side members 39, at their under sides, are rabbeted at 41. The extended upper end portions of the side members 39 slidably rest on the ways 29 and with the lower end portions of said side members extending between the ways 29 with a working fit.

The tops of the side members 39 are concave on the arcs of circles having their centers at the projected axis of the shaft 34. The end portions of the blades 37 are mounted in kerfs 42 in the inner sides of the frame side members 39. These kerfs 42 are on radial lines extending from the centers of the arcs on which the tops of the side members 39 are formed. Said kerfs 42 are circumferentially spaced equidistances apart. The upper edges of the blades 37 are flush with the concave tops of the side members 39 and said blades rest on the bottoms of the kerfs 42. The blades 37 are held in the kerfs 42 in each frame side member 39 by a small rod 43 which extends through holes 44 in the respective end portion of said blade and lies in a longitudinal groove 45 in the top of said side member.

Within the housing 22, above the gang of blades 37 is a rotary cam 46 for pressing a slice of potato onto said blades to cut the same into strips. This cam 46 is semi-cylindrical with its axis extending parallel to the axis of the shaft 34. The cam 46, at its inner end, is integral with an annular cast head 47. The head 47 has at its axis a hole through which the stud 35 projects and said head has threaded engagement with the screw threads 36 to detachably secure the head 47 to the shaft 34 to be rotated thereby.

The central portion of the head 47 is inset to afford clearance for the bearing 33 and permit the outer portion of the head 47 to be closely positioned to the housing back member 23. The cam 46 at its front end is open and the front housing member 24 affords a closure therefor. The axis of the cam 46 is parallel to the axis of its head 47 and eccentric thereto.

On the front transverse edge portion of the cam 46 is a slicing blade 48 that extends the full width thereof and projects forwardly thereof. This blade 48 overlies the front edge portion of the cam 46 on the inner side thereof and is rigidly secured to said cam. The slicing blade 48, forwardly of the cam 46, is transversely corrugated similar to the cutting blades 37 and has a beveled sharp cutting edge.

The slicing blade 48, during the rotation of the cam 46, passes transversely over the gang of cutting blades 37 and the distance between said gang of blades and the slicing blade 48 determines the thickness of a slice to be cut from a potato. The diameter of the head 47 is such that it passes over the gang of blades 37 with a working clearance. The position of the cam 46 on the head 47 is such that the rear end of the cam 46 is substantially flush with the adjacent edge of the head 47 and the cam 46 at the slicing blade 48 is considerably inwardly of the adjacent edge of said back member. This extension of the head 47 relative to the cam 46 acts as a guard to prevent a slice being cut from a potato from moving out of the range of the respective corrugated portions of the gang of blades 37.

Potatoes are fed into the cam 46 at its open front end through a tubular hopper 49 that is upwardly and outwardly inclined at the front of the machine. The lower end portion of the hopper 49 is removably telescoped into an inclined holder 50 substantially entirely within the cam 46. The holder 50, of course, determines the inclination of the hopper 49. This holder 50 is cylindrical and has an internal annular shoulder 51 on which the hopper 49, at its lower end, removably rests. On the inner side of the holder 50 is a second bearing 52 for the shaft 34 and into which bearing the stud 35 projects. The holder 50 has, below the lower end of the hopper 49, a deflector 53 which directs the potatoes as they leave the hopper 49 toward the gang of blades 37. Potatoes deposited in the cam 46 from the hopper 49 escape through the semi-circular opening or gap on the cam 46 between its rear end and the slicing blade 48 and drop onto the gang of blades 37. Potatoes in the hopper 49 prevent the lowermost potato or potatoes from bouncing around during the rotation of the cam 46.

To prevent a slice, as it is cut from a potato, from following the cam 46 at the completion of the cutting thereof, I provide an automatic stop 54 therefor. This stop 54 is in the form of a horizontally disposed plate 55 that extends transversely in the housing 22 and has on its left-hand edge a downturned flange 56. The plate 55 rests on a horizontal rod 57 that has its inner end portion rigidly secured to the housing back member 23 and its front end portion projects into a hole in the housing front member 24 and is supported by said front member. The plate 55 is held on the rod 57 to turn about its axis by an open sleeve-like member 58 on the end portion of the plate 55. This plate 55 is yieldingly held on a stop 59 on the respective way 29 outwardly of the rod 57 by an upright coiled spring 60. This spring 60 is anchored at its lower end by a screw 61 to the way 29 and attached at its upper end in slots 62 in the intermediate portion of the outer longitudinal edge portion of the plate 55.

The flange 56 is just below the adjacent wall of the deflector 53 and also just below the path of movement of the slicing blade 48. As the slicing blade 48 passes over the inner longitudinal edge portion of the plate 55, the cam 46 engages said plate and moves the same downwardly against the tension of the spring 60 and thus allows said cam to pass the automatic stop 54. The leverage from the rod 57 to the inner longitudinal edge of the plate 55 is much longer than that from said rod to the spring 60 so that comparatively little pressure is required to trip the automatic stop 54 into an inoperative position.

When a potato on the gang of cutting blades 37 is engaged by the slicing blade 48 to cut a slice therefrom, said potato will be moved against the deflector 53 as a base of resistance. On the inner side of the deflector 53 that is engaged by a potato, while a slice is being cut therefrom, is a plurality of long horizontal teeth 63 that are vertically spaced. The purpose of these teeth 63 is to prevent a potato from being lifted from the gang of blades 37 by the blade 48 while cutting a slice from said potato.

Formed in the base 21 under the gang of cutting blades 37 is an escape opening 64 through which strips of potatoes from said gang of blades are precipitated into a receptacle, not shown, placed under said opening.

As one means for turning the shaft 34 to rotate the cam 46 and the slicing blade 48, there is mounted on the base 21 at one side of the machine, an electric motor 65. The driving connections from the motor 65 to the shaft 34 include a V-belt 66 arranged to run over a small V-pulley 67 on the armature shaft 68 of said motor and a large V-pulley 69 on the shaft 34 close to the back of the housing 22.

A guard 70 for the belt 66 and the pulleys 67—69 comprises a skeleton sheet metal housing 71, the front of which is open and only portions of the belt are exposed between the housing 22 and the motor 65 and the back of the housing 71 is closed by a wire mesh panel 72.

Peeled potatoes to be cut into strips are placed in the hopper and successively fed by gravity into the cam 46 and the lowermost will drop through the gap in said cam, between the slicing blade 48 and the rear end of said cam, and be successively deposited on the gang of cutting blades 37. During the rotation of the cam 46, slices will be successively cut from the potato and the following cam 46 will press the same onto the gang of blades 37 and be cut thereby into strips. As a slice of potato is pressed by the cam 46 between the gang of cutting blades 37 and cut into strips, it will force the previously cut strips downward and out of said blades to be precipitated through the escape opening 54. While a slice is being cut from a potato by the slicing blade 48, the cam 46 will move under the potatoes and place the same in the cam 46. As the cam 46, at its rear end, moves from under the potatoes, said potatoes will drop through the gap in said cam and be redeposited on the cutting blade 37 to have a slice cut therefrom during the next cycle of operation of the slicing blade 48.

Figure 19:
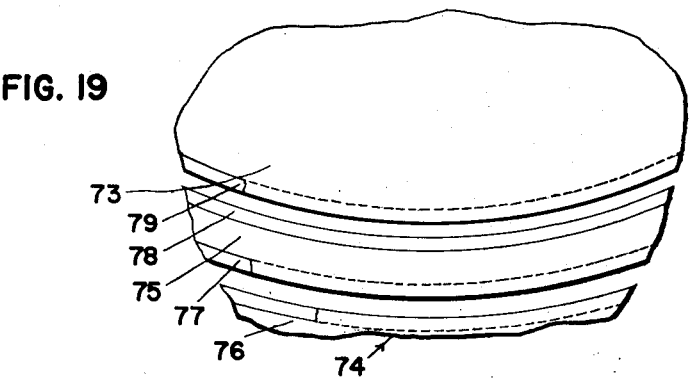
Fig. 19 is an elevational view of a potato having two slices cut from the under side thereof and the potato and the slices segregated.
Figure 20:
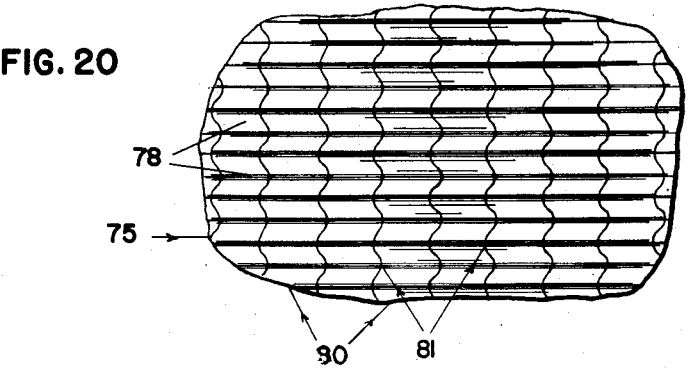
Fig. 20 is a plan view of the second slice cut from the potato as shown in Fig. 19.
Figure 21:
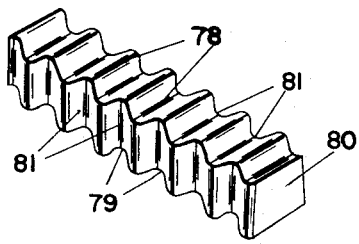
Fig. 21 is a perspective view of one of the slices, as shown in Fig. 20.

Referring now to the process of cutting a peeled potato first into slices and second in cutting the slices into strips for "French fries," as shown in Figs. 19, 20 and 21, it may be presumed that there is a potato resting on the gang of cutting blades 37 and the cam 46 is being rotated in the direction of the arrow shown in Fig. 5 with the slicing blade 48 in advance thereof. Slices are successively cut from the under side of a potato by the slicing blade 48 and, as heretofore stated, the distance of said slicing blade above the gang of cutting blades 37 determines the thickness of the slices. At the time the slicing blade 48 strikes a potato, it pushes the same into contact with the deflector 53 as a stop and is held by the teeth 63 from lifting at its front end.

Fig. 19 shows a potato 73 from which a first slice 74 and a second slice 75 have been cut by the slicing blade 48. In cutting the first slice 74, the blade 48 forms longitudinal corrugations 76 in the upper side of the first slice 74 and longitudinal corrugations 77 in the under side of the potato 73. The slicing blade 48 cutting the second slice 75 will form longitudinal corrugations 78 in the upper side of said slice and longitudinal corrugations 79 in the under side of the potato 73.

Fig. 20 is a plan view of the second slice 75 with the longitudinal corrugations 78 therein. Fig. 20 also shows the slice 75 transversely cut into strips 80 by the gang of cutting blades 37 that forms corrugations 81 in the sides of the strips 80 as shown in Fig. 21. Fig. 21 shows one of the strips of potatoes 80.

From what has been said, it will be understood that the vegetable slicing machine described is capable of modifications as to details of construction and arrangement within the scope of the invention herein disclosed and claimed.

What I claim is:

1. In a device of the class described, a gang of horizontally disposed cutting knives, a slicing knife-equipped cam for cutting a slice from a potato on the gang of knives, said cam being inverted to turn on a horizontal axis, means for turning the cam, a stop member for preventing a slice cut by the slicing knife from a potato on the gang of cutting knives from following the slicing knife, said top member comprising a plate intermediately pivoted to tilt about a horizontal axis that extends transversely of the cam and having a flange on its end facing the cam as the same is moving over the gang of cutting knives, a stop under the opposite end portion of the plate from its flange, and a spring yieldingly holding the plate on the stop, said stop positioning the plate with its flange just below the path of movement of the slicing knife, and in the path of movement of the cam whereby the cam engages the flange and tilts the plate and moves the flange out of its path of movement.

2. In a device of the class described, a housing having a removable front member and back member, the former having an oblique hopper holder in the housing, a hopper removably mounted in said holder, said back member and hopper holder each having a bearing, the bearings being horizontally axially aligned and axially spaced apart, a shaft journaled in the bearings, means for turning the shaft, an annular head held on the shaft between the bearings for rotation therewith, a cam on the arc of a circle eccentric to the axis of the head and fixed thereto, a slicing knife fixed to the leading end of the cam, and a gang of horizontally disposed cutting knives over which the slicing knife and the cam pass during rotation thereof.

CLIFFORD WILLIAM KUBON.

References Cited in the file of this patent

UNITED STATES PATENTS

| Number | Name | Date |
|---|---|---|
| 76,912 | Heberling | Apr. 21, 1863 |
| 1,265,527 | Schaeffer | May 7, 1918 |
| 1,303,617 | Tuck | May 13, 1919 |
| 1,395,425 | Kennedy | Nov. 1, 1921 |
| 1,667,321 | Kintzele | Apr. 24, 1928 |
| 1,748,997 | Rentos | Mar. 4, 1930 |
| 2,088,298 | Love | July 27, 1937 |
| 2,187,957 | Urschel | Jan. 23, 1940 |
| 2,485,344 | Abbott | Oct. 18, 1949 |

FOREIGN PATENTS

| Number | Country | Date |
|---|---|---|
| 3,764 | Great Britain | Mar. 10, 1888 |